May 24, 1966   J. H. HEIDORN   3,252,296
REFRIGERATING COMPRESSOR WITH INTEGRAL EXPANSION VALVE
Filed Feb. 24, 1964   4 Sheets-Sheet 1

INVENTOR.
JOHN H. HEIDORN
BY Carl A. Stickel
ATTORNEY

May 24, 1966  J. H. HEIDORN  3,252,296
REFRIGERATING COMPRESSOR WITH INTEGRAL EXPANSION VALVE
Filed Feb. 24, 1964  4 Sheets-Sheet 2

INVENTOR.
JOHN H. HEIDORN
BY
Carl A. Stickel
ATTORNEY

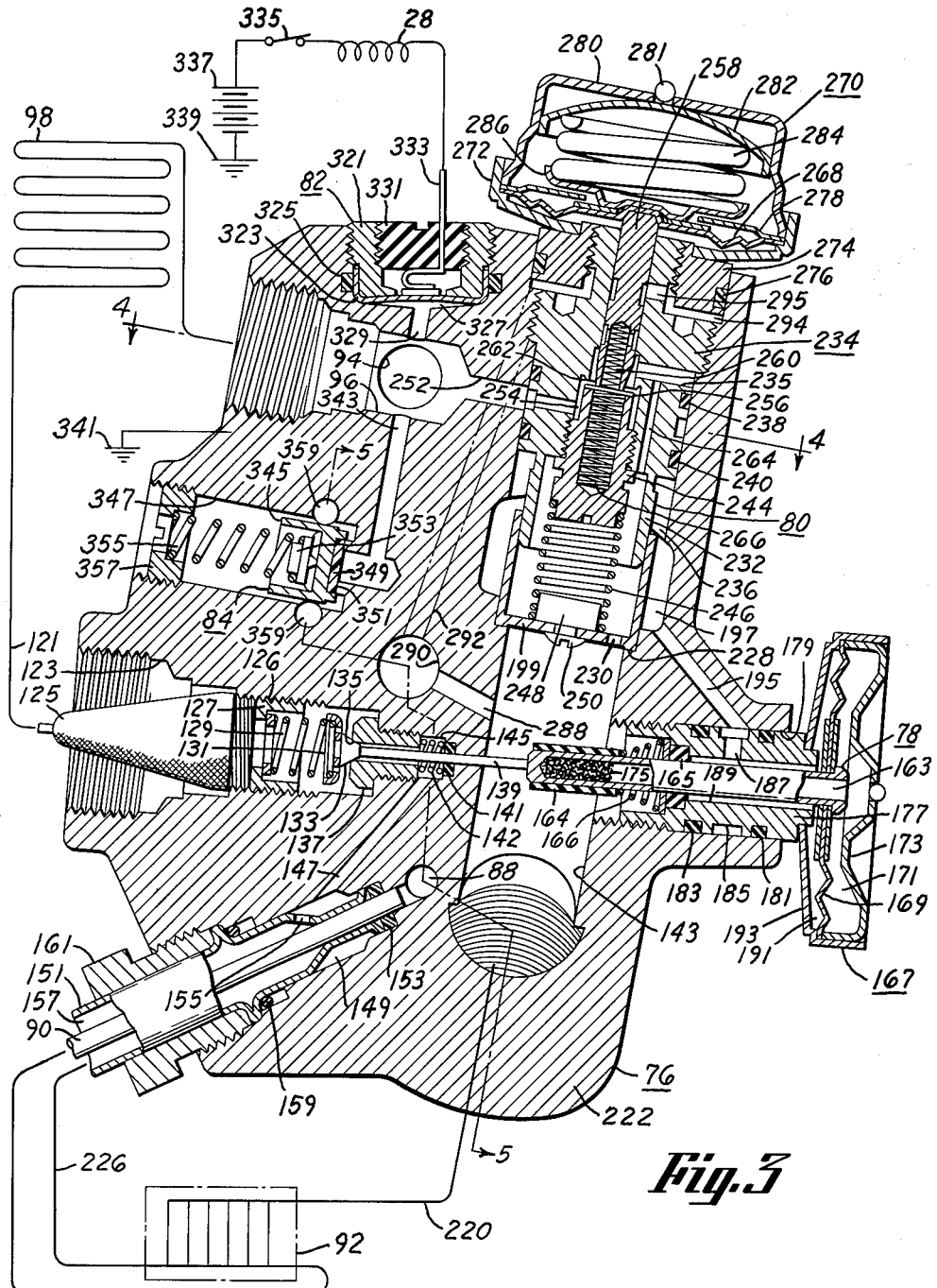

May 24, 1966  J. H. HEIDORN  3,252,296
REFRIGERATING COMPRESSOR WITH INTEGRAL EXPANSION VALVE
Filed Feb. 24, 1964  4 Sheets-Sheet 4
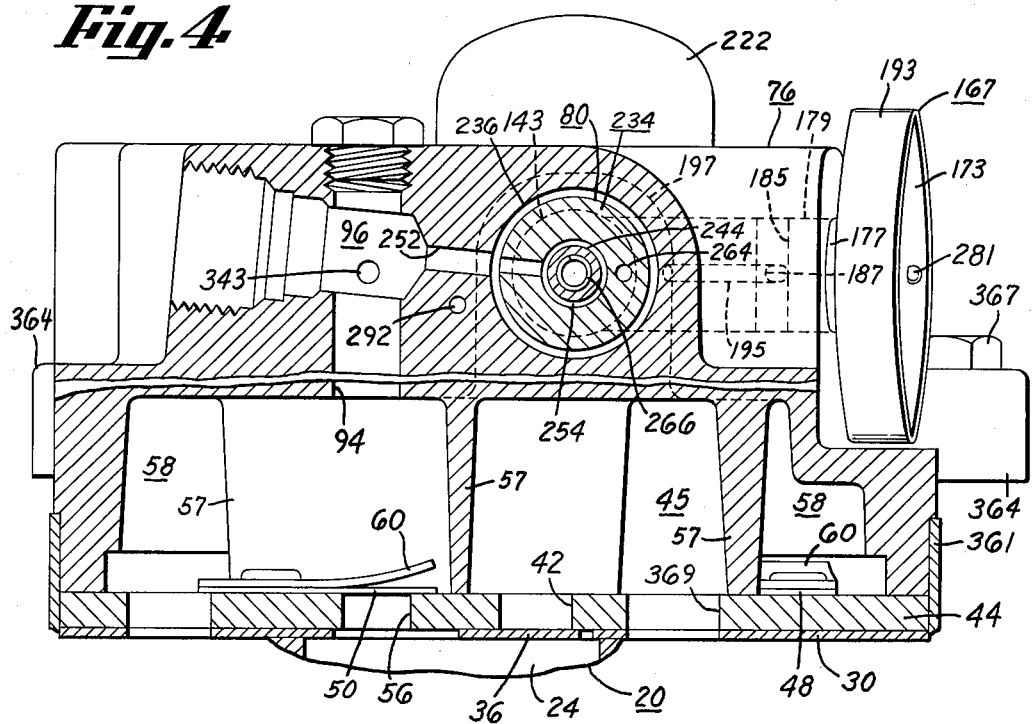
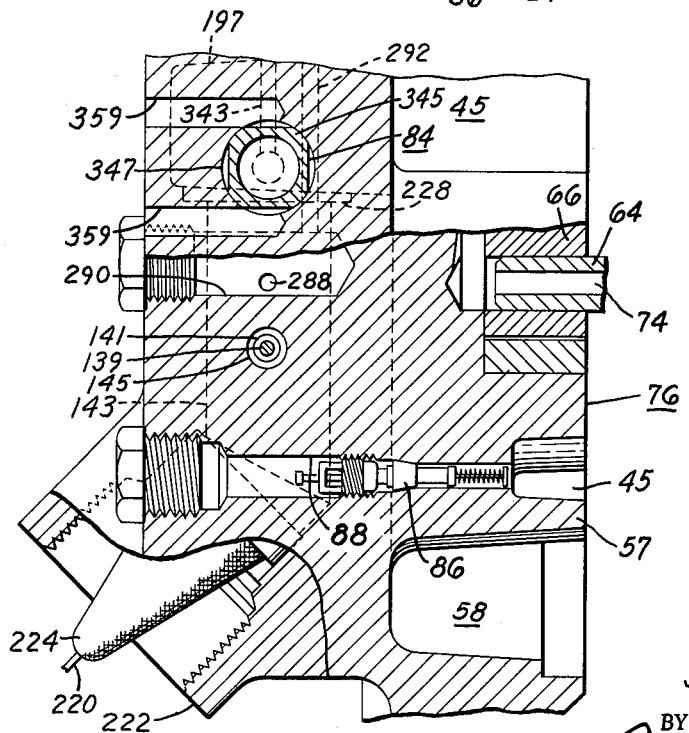
INVENTOR.
JOHN H. HEIDORN
BY Carl A. Stickel
ATTORNEY

United States Patent Office 3,252,296
Patented May 24, 1966

3,252,296
REFRIGERATING COMPRESSOR WITH INTEGRAL EXPANSION VALVE
John H. Heidorn, Dayton, Ohio, assignor to General Motors Corporation, Detroit, Mich., a corporation of Delaware
Filed Feb. 24, 1964, Ser. No. 346,917
10 Claims. (Cl. 62—210)

This invention pertains to refrigerating apparatus and more particularly to automobile air conditioning systems.

The engine compartments of present models of automobiles are well filled, especially when a V–8 engine is placed therein together with power steering, power brake elements, a windshield washer, a battery, a generator, a starter, an air cleaner, and a heater. When automobile air conditioning systems are added, the crowding is increased. It then becomes a problem to locate the compressor, the expansion valve, the suction throttling valve and the condenser and the evaporator as well as the connecting conduits so that they will be readily accessible for repair and/or adjustment and yet will not make inaccessible various parts of the engine such as the spark plugs, distributor, starter, generator and fuel pump. The making of the conduit connections at the expansion valve and the suction throttling valve as well as the adjustment and repair of these valves is also a problem since a firm support is not provided for these valves ordinarily. These valves and conduits are also liable to be damaged whenever the automobile is worked on by auto mechanics and service men.

It is an object of this invention to locate the expansion valve and the suction throttling valve of an automobile air conditioning system in such a place where they will be readily accessible for adjustment and repair and will not render inaccessible any part of the automobile engine or other accessories within the engine compartment which require frequent servicing.

It is another object of this invention to minimize the number and length of the external connections.

It is another object of this invention to incorporate an expansion valve, a suction throttling valve, a safety switch and a high pressure relief valve economically within the compression body and especially in the compressor head.

It is another object of this invention to provide a more economical and convenient arrangement of the expansion valve and the suction throttling valve and other controls in an air conditioning system.

These and other objects are attained in the form shown in the drawings in which a compact three-piston double acting automotive type compressor has at one end a special valve head providing passages for direct connection with the condenser and the evaporator and also incorporating a thermostatic expansion valve, a suction line pressure regulating valve, a low pressure safety switch, a high pressure relief valve, a check valve through which liquid is drawn from the bottom of the evaporator in addition to the usual inlet and outlet valves of the compressing means.

Further objects and advantages of the present invention will be apparent from the following description, reference being had to the accompanying drawings wherein a preferred embodiment of the present invention is clearly shown.

In the drawings:

FIGURE 3 is a transverse sectional view taken along the lines 3—3 of FIGURE 1;

Figure 2:
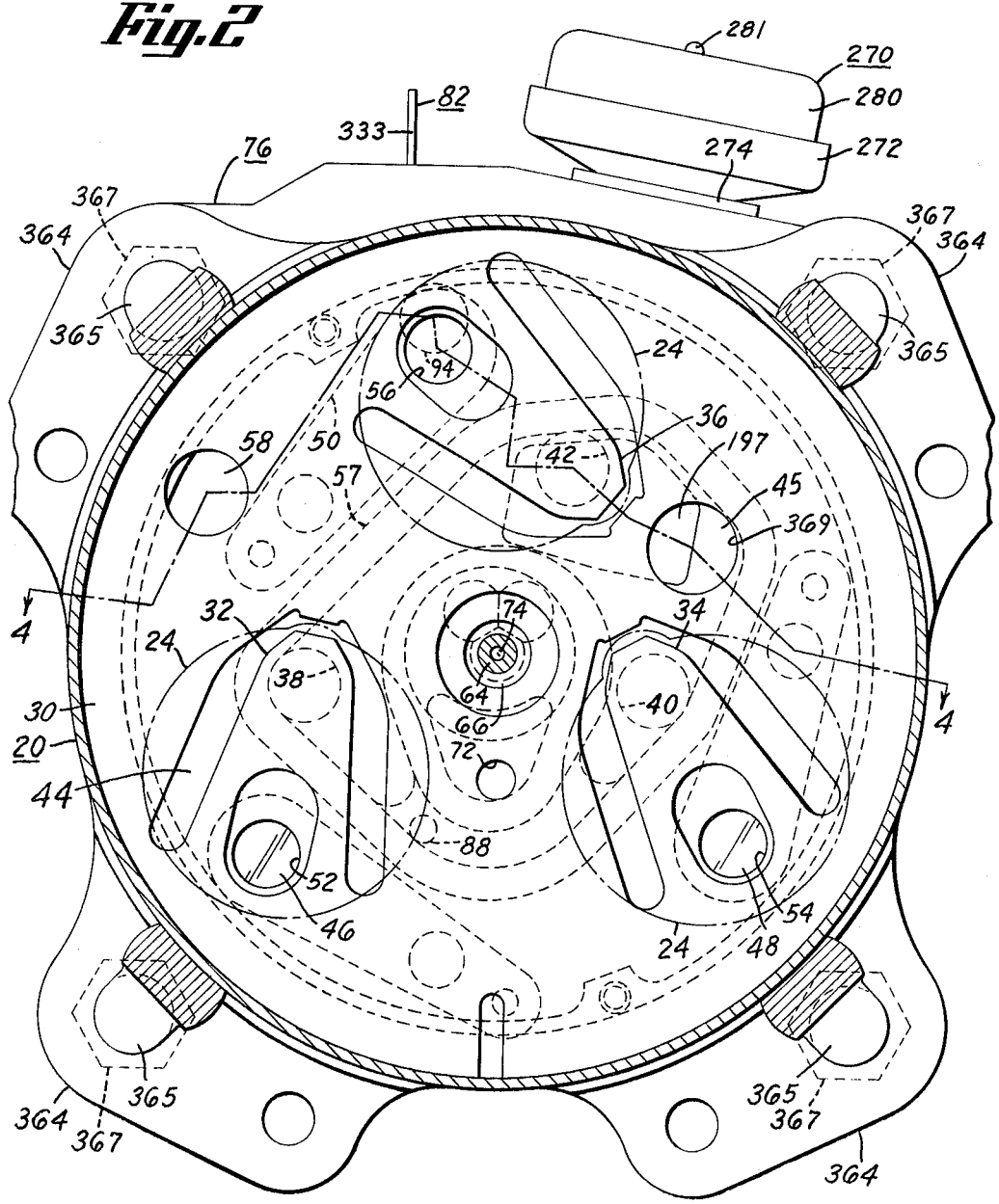
FIGURE 2 is a transverse sectional view taken along the lines 2—2 of FIGURE 1.

FIGURE 4 is a fragmentary sectional view taken along the lines 4—4 of FIGURES 2 and 3, with the upper and lower parts separated by a break line; and FIGURE 5 is a fragmentary sectional view taken along the lines 5—5 of FIGURE 3.

Figure 1:
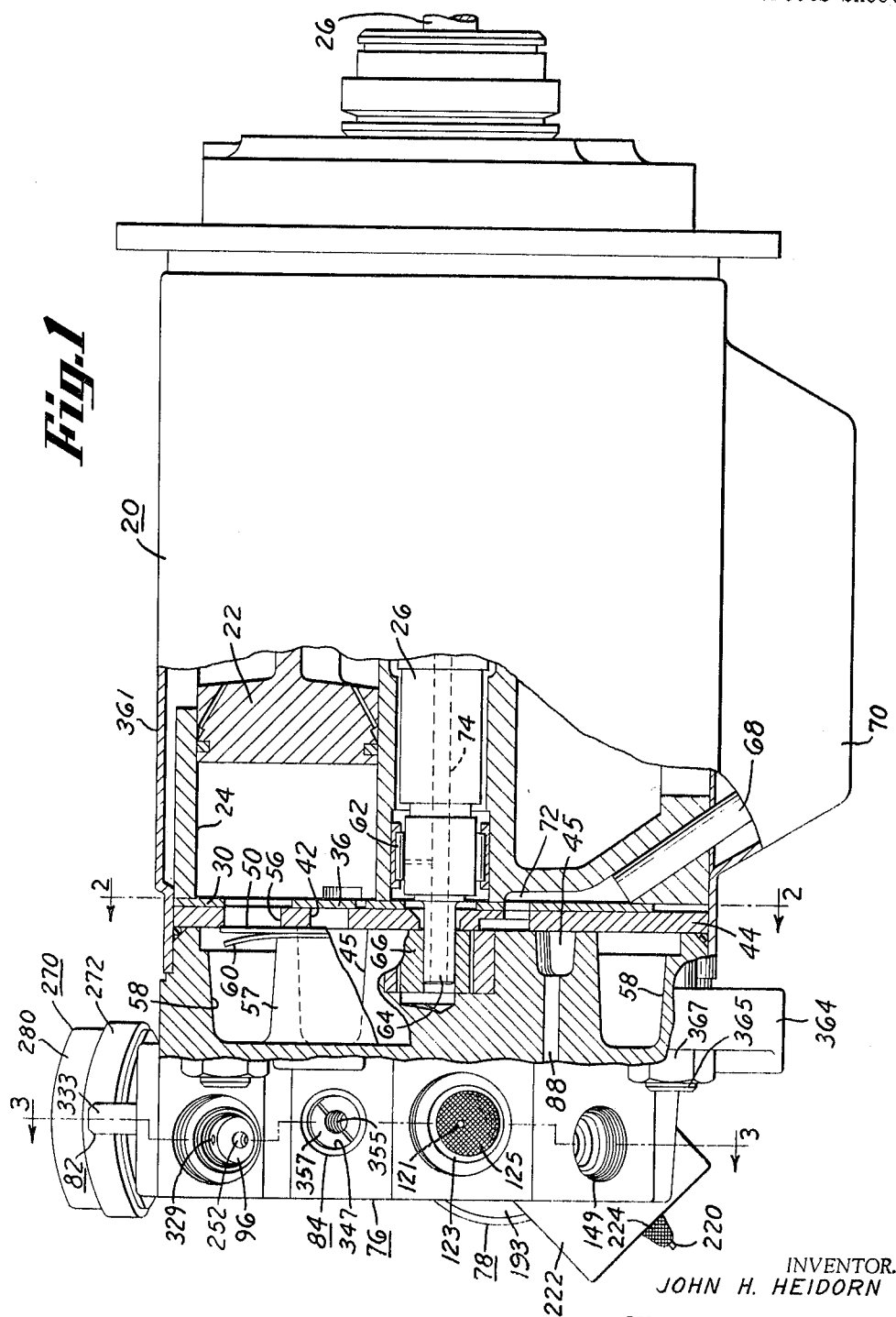
FIGURE 1 is a view in elevation of an automobile compressor for an automobile air conditioning which is partly in section for the purpose of illustrating one form of my invention.

Referring now to FIGURE 1, there is illustrated an automotive type compressor 20 for an automotive air conditioning system which is generally similar to the compressor shown in Patent No. 3,057,545, issued October 9, 1962. This compressor includes three double acting pistons 22 reciprocating horizontally in three pairs of cylinders 24 by a motion converting mechanism driven by the shaft 26 through the use of an electromagnetic clutch illustrated diagrammatically by the solenoid coil 28 in FIGURE 3. The compressor 20 includes a thin inlet valve plate 30 providing three flapper valves 32, 34, and 36, cooperating with the inlets 38, 40, and 42 through which evaporated refrigerant is drawn from the inlet chamber 45 into the interior of the cylinder 24 which cooperates with the piston 22 to form the compressing means. The inlet passages 38, 40, and 42 are formed in the flat disk 44 forming the cylinder head for the three cylinders 24 at one end of the compressor 20.

Upon the opposite side of the plate 20 are provided individual discharge valves 46, 48, and 50 which cooperate with the discharge passages 52, 54, and 56 in the plate 44 to provide for the discharge of the compressed refrigerant into the discharge chamber 58. The discharge chamber 58 is separated from the inlet chamber 45 by an endless wall 57. The discharge valves 46, 48, and 50 are provided with stop members 60 which will prevent them from being over stressed by excessively wide openings. The compressor shaft 26 is supported in bearings 62 at the opposite ends. Also at the ends shown in an extension 64 connecting with an internal gear type pump 66 which draws lubricant through the intake tube 68 from the oil sump 70 through the inlet passage 72 and discharges the oil through drilled passages 74 in the shaft and other parts of the compressing means for distribution of the lubricant to the various bearing surfaces and pistons of the compressor in a manner more fully described in the aforementioned Patent No. 3,057,545.

According to my invention, instead of the simple cylinder head as is designated by the referenced character 24 in the aforementioned Patent No. 3,057,545 being provided only with connections to the outlet line 55 and the inlet line 60, I provide an enlarged and more complicated cylinder head 76 which includes the discharge chamber 58 and the inlet chamber 45 as well as an automatic thermostatic expansion valve 78, a dual pressure responsive suction line valve 80, a low pressure safety switch 82, a high pressure relief valve 84, and a check valve 86 (see FIGURE 5). To carry this out, the inlet chamber 45 is provided with a passage 88 within which fits the tire check valve 86. The passage 88 then connects with the small tube 90 connecting with the bottom of the parallel pass evaporator 92. Through this arrangement under periods of a predetermined low pressure in the inlet chamber 45, liquid is drawn from the bottom of the evaporator 92 so as to assure the return of lubricant to the lubricant 70 of the compressor 20.

The discharge chamber 58 is connected through the passage 94 in the cylinder head 76 extending to a transverse passage 96 connected as diagrammatically shown in FIGURE 3 with the inlet of the condenser 98 mounted in front of the conventional automobile radiator of the automobile which is to be air conditioned as illustrated in Patent No. 2,714,808 issued August 9, 1955, or Patent No. 2,774,222 issued December 18, 1956. The outlet of the condenser 98 is connected by the tubing 121 with the inlet of a passage 123 in the valve head 76. This passage 123 is provided with a screen 125 and threads for making a conventional threaded flare connection with the liquid tubing 121. Within the passage 123 is a threaded section 126 receiving a threaded spring retainer 127 supporting one end of the coil spring 129, the other end of which is held by the spring retainer 131 mounted on the end of the expansion valve 133 cooperating with the seat 135 in a threaded bushing 137 which is threaded into a reduced threaded portion of the passage 123. The valve 133 has a valve stem 139 extending through the seal ring 141 and a wall portion of the cylinder head 76 into the suction passage 143. A small coil spring 142 extends between the threaded bushing and the seal ring 141 to hold the seal ring 141 tightly against the end of the chamber 145 in sealing engagement with the valve stem 139. The threaded bushing 137 has a restricted passage surrounding the valve stem 139 connecting with the chamber 145 formed between the threaded bushing 137 and the seal ring 141. This chamber 145 is connected by the passage 147 with the passage 149 surrounding the small tube 90.

This passage 149 is provided with a sleeve 151 having a reduced portion provided with a seal ring 153 providing a seal between the tube 90 and the adjacent wall of the cylinder head 76. This seal ring 153 provides a seal between the sleeve 151 and the tube 90 and also the cylinder head 76 so as to prevent leakage between the passages 88 and 147. The sleeve 151 has an aperture 155 in its conical portion connecting with the space 157 surrounding the small tube 90 within the sleeve 151. The sleeve 151 is provided with an outwardly flared end portion making sealing engagement between the sleeve 151 and the passage 149. A conventional gland nut 161 is threaded into the enlarged end portion of the passage 149 and has its outwardly flanged end tightly pressed by the gland nut 161 into engagement with the outwardly turned flange of the sleeve 151 so as to hold the seal ring 159 tightly in engagement with the outwardly turned flange of the sleeve 151 and also into engagement with the wall of the passage 149. The flow of liquid refrigerant from the condenser 98 to the evaporator 92 is thereby controlled through the movement of the valve 131 away from its seat 135 in the threaded bushing 137.

This valve 133 is opened by a combined temperature and pressure responsive system which includes the hollow stem 163 having its closed end in contact with the valve stem 139 and preferably firmly connected thereto. This stem 163 extends through the seal ring 165 to the diaphragm assembly 167 which includes the flexible metal diaphragm 169 connected to the open end of the stem 163. The open end of the stem 163 opens into the thermostatic chamber 171 which is formed between the diaphragm 169 and the cap member 173. The hollow stem 163 togther with the chamber 171 are principally charged with a vapor change of difluorodichlormethane. To assure that any of this volatile in liquid form is held in the portion within the passage 143, there is provided a wick in the closed end of the stem 163 which is formed of capillary material such as wool, felt, or fiber glass 175. However, instead of the felt or fiber glass 175, there may be provided activated charcoal and the interior of the stem 163 as well as the chamber 171 may be charged with a gas which remains in the gaseous state under the conditions of operation such as carbon dioxide which is absorbed and involved by the activated charcoal in accordance with the changes in temperature in the passage 143. The stem 163 is surrounded by a thin sleeve 164 of synthetic rubber to reduce its sensitivity to fluctuations in the temperature of the cold gas in the inlet passage 143.

The seal ring 165 is held within a bushing 177 which is threaded into the bore 179 extending horizontally within the cylinder head 76. At the inner end of the sleeve 164 is a conical coil spring 166 having its small end tightly embracing the hollow stem 163 and having its large end pressing against a thin washer to hold the seal ring 165 in place to seal the adjacent end of the cylindrical space 189. The bushing 177 is provided with the inner and outer seal rings 181 and 183 between which there is an annular passage 185 and an inwardly extending passage 187 providing a connection with the cylindrical space 189 surrounding the stem 163 providing a connection with the pressure chamber 191 formed between the diaphragm 169 and the inner cap 193. The cap 193 has the edges of its central aperture sealed to the outer end of the bushing 177 and its outer edges sealed to the periphery of the outer cap 173 and the edges of the diaphragm 169. The annular space or chamber 185 is connected by the drilled passage 195 to the inlet passage 197 connecting the suction passage 143 with the inlet chamber 45 whenever the suction line valve 199 is in the open position. The passage 143 connects through a conventional threaded flare connection with the end of the suction line 220 which extends to the outlet of the evaporator 92. The threaded outlet of the suction passage 143 is provided in the angular extending boss 222 containing a strainer screen 224 (FIGURE 1).

With this arrangement through the chamber 45, the passages 197, 195, 185, 187, 189, and the chamber 191, the inner face of the diaphragm 169 is exposed to the suction pressure of the compressing means while the outer face of the diaphragm 169 is responsive to the temperature of the gas passing through the suction passage 143. The diaphragm 169 through its central connection with the outer end of the tube 163 moves the valve stem 139 to move the valve 133 to a position in which the difference of the two pressures prevailing in the chambers 191 and 171 is balanced by the force of the spring 129. The force of the spring 129 is adjusted by the position of the threaded bushing 127 to provide the correct flow of liquid refrigerant through the passage 123 and the threaded bushing 137 as well as the chamber 145 and the passages 147, 155, and 157 with the conduit 226 connecting with the inlet of the evaporator 92. This expansion valve system provides a sensitive control of the liquid flow into the evaporator 92 so that the evaporator 92 can obtain the maximum amount of liquid refrigerant it can beneficially use at the prevailing speed and compressing ability of the compressor 20.

The flow of refrigerant out of the evaporator 92 through the conduit 220 is controlled by the cup-shaped piston valve 199 which cooperates with the shoulder seat 228. The piston valve 199 is slidably mounted on the cylindrical extension 232 of the fitting 234 which is fitted into the bore or chamber 236. The fitting 234 is provided with grooves receiving the seal rings 238 and 240 which seal it in the bore or chamber 236. The fitting 234 has its upper end permanently threaded into the bore 236. The fitting 234 has threaded into it a spring retainer 244 which supports one end of the tension coil spring 246. The opposite end of the tension coil spring 246 is connected to a collar 248 fastened to the head of the piston valve 199 by the screw 250. This spring 246 therefore tends to pull the piston valve 199 to the open position. The piston valve 199 is pushed toward closed position by the pressure within it. This pressure is obtained from the compressor discharge passage 94 through the branch passage 252 connecting with a valve chamber 254 containing a thin disk valve 256 held between the inner end of the threaded fitting 244 and the seat 262 formed by a shoulder at the upper end of the chamber 254. Within the seat 262 is an annular chamber formed around the lower end of the follower 258 connecting with the passages 235 and 264 which connects with the chamber provided inside the cylindrical extension 232 which connects with the interior of the piston valve 199. The piston valve 199 has a small bleeder escape port 230 which reduces the sensitivity of the system and prevents fluctuation so that the valve 199 will not fluctuate rapidly but will assume a more constant position.

The thin disk valve 256 is normally pushed toward its seat by a light coil spring 266 within the fitting 244 which presses against the thin disk valve 256 from the bottom. The follower 258 has a hollow, lower end containing a small spring 260 bearing upon the thin disk valve 256. The thin disk valve 256 is moved away from its seat by the follower 258 extending upwardly through the central bore of the fitting 244 into contact with the lower face of the flexible thin metal diaphragm 268 forming part of the fluid motor 270. This fluid motor 270 includes an inner cup shaped member 272 having its inner aperture bonded to the ring 274 sealed to the bore or chamber 236 by a seal ring 276. This ring 274 is threaded onto the reduced upper end portion of the fitting 234. The rim of the diaphragm 268 is held and sealed in place by the internal diaphragm stop member 278 which is held in place by the lower rim of the inverted cap member 280. The cap member 280 is evacuated and sealed by a ball seal 281. The inverted cap member 280 contains a spring retainer 282 supporting the upper end of a compression type coil spring 284 having its lower end bearing on the flange spring retainer 286. This retainer 286 has its central portion bearing on the central portion of the diaphragm 268 above the follower 258. The diaphragm 268 is made responsive to the pressure in the suction inlet passage 143 through the passages 288, 290, and 292, connecting with the annular space 294 between the fitting 234 and the ring 274. This annular space 294 connects through a drilled passage 295 with an annular groove on the follower 258 which has sufficient clearance within the fitting 234 to provide a restricted passage connecting with the chamber formed between the inner cup shaped member 272 and the diaphragm 268. This restricted passage has a sufficient throttling action to slow down variations in the pressure applied to the diaphragm to minimize hunting.

With this arrangement, when there is a rise in pressure in the inlet passage 143 corresponding to the rise in pressure in the evaporator 92, there will be a flow of gas from the inlet passage 143 through the passages 288, 290, 292, the annular chamber 294 and through the restricted passage between the follower 258 and the fitting 234 to the chamber between the inner cup shaped member 272 and the diaphragm 268 which will lift. When the diaphragm 268 lifts, the light spring 266 will push the thin valve disk 256 closer to its seat 262 thereby reducing the flow of high pressure gas from the passage 94 through the passage 252 and the chamber 254 past the valve 256 through the passage 235 and the passage 264 into the interior of the piston valve 199. This reduced flow, due to the leakage through the bleeder escape port 230, will reduce the pressure within the piston valve 199 allowing the spring 246 to pull the piston valve 199 farther open to allow more gas to flow from the suction passage 143 to the suction passage 197. This will tend to reduce the pressure within the evaporator 92 and in effect will maintain a substantially constant pressure therein.

The low pressure safety switch includes a removable threaded metal plug 321 which is hollow and has its inner end closed by a snap action dished diaphragm 323 which is in the form of a cap having its skirt portion surrounding and being rolled in the sealing engagement with the inner end of the threaded plug 321. The threaded aperture in the valve head 76 is provided with a seal ring 325 for making sealing engagement between the skirt of the diaphragm 323 and the valve heads so as to seal the diaphragm chamber 327. This diaphragm chamber 327 is connected by a short passage 329 with the passage 96. The hollow central portion of the plug 321 contains a threaded plastic insert 331 having imbedded therein an electrical terminal 333. This terminal 333 has its inner end bent into a U-shape to form an electrical contact which is normally engaged by the contact on the adjacent face of the diaphragm 323. The terminal 333 is connected to the electromagnetic coil 28 for the electromagnetic clutch which in turn is connected through the manual control switch 335 with one terminal of the battery 337. The other terminal of the battery 337 is connected to a ground 339. The valve head 76 is likewise electrically connected to a ground 341. With this arrangement as long as the switch 335 is closed and the diaphragm 323 is dished outwardly to make an electrical connection with the terminal 333, the electromagnetic coil 28 will be energized. However, should there be a sufficient loss of refrigerant from the refrigerating system, the pressure within the passage 94 will be reduced sufficiently that the diaphragm 323 will snap downwardly to the inwardly dished position thereby separating the contact of the terminal 333 with the contact on the adjacent base of the diaphragm 323 to break the circuit of the electromagnetic coil 28. This will declutch the compressor from the driving engine and protect the compressor and the refrigerating system from possible damage. During cold weather cold enough to reduce the pressure in the condenser 98 below 30 pounds, the diaphragm 323 will also snap downwardly to declutch and prevent unnecessary operation of the compressor.

In the event that there should be a leak in the low side of the refrigerating system which would allow the entrance of air therein, there is a possibility that a dangerously high pressure may be reached upon the high side of the refrigerating system. To minimize this danger the pressure relief valve 84 is provided with a connection through the passage 343 with the high pressure passage 96. The high pressure relief valve 84 includes a valve 345 (FIGURES 3 and 5) which is square with rounded corners in cross section slidably mounted in the cylindrical bore 347. This valve 345 includes a disk 349 of resilient plastic adapted to be seated on the seat 351 at the inner end of the bore 347. Within the valve 345 is a conically pointed spring retainer 353 supporting the inner end of the coil spring 355. The outer end of the coil spring is supported by the threaded plug 357 which may be used to adjust the tension of the spring 355.

Upon a dangerously high pressure which is higher than that for which the relief valve 84 is adjusted, the valve 345 will be pushed off its seat 351. The escaping gas can pass along the flat sides of the valve 345. Further means of escape is provided by the passages 359 extending outwardly from the bore 347 as shown in FIGURE 5.

The sheet metal casing 361 of the compressor 20 is extended axially around the plates 30 and 44 and the innermost portion of the head 76. The head 76 is provided with four or more ears 364 through which pass four studs 365 which extend from the casing 361. Each of these studs 365 is provided with a nut 367 for clamping the head 76 to the casing 361.

When the suction valve 199 is open sufficiently wide that it is not throttling, the pressure at the inlet passage 197 will be substantially the same as the pressure in the suction passage 143. This will cause the temperature response of the expansion valve 133 as measured by the vapor in the hollow stem 163 and applied to the thermostatic chamber 171 to maintain a constant superheat because the pressure in the pressure chamber 191 will respond to the pressure at the same point from which the temperature measurement is taken by the hollow stem 163. This is similar to the operation of a conventional thermostatic expansion valve.

However, when the suction valve 199 begins to throttle the flow of gas from the suction passage 143 to the inlet passage 197, the pressure within the inlet passage 197 will fall below the substantially constant pressure maintained in the suction passage 143. This reduction in pressure is reflected through the drilled passage 195, the annular passage 185, the inwardly extending passage 187, the cylindrical space 189 to the pressure chamber 191.

This pressure reduction in the chamber 191 causes a reduction in the superheat of the suction gas being drawn to the compressor. If the pressure reduction is great enough, the superheat of the suction gas will be reduced to zero and the expansion valve 133 may open wide. This will allow sufficient refrigerant flow into the evaporator to flood the parallel pass evaporator 92 whenever excess compressor capacity is available. This has the desirable effect of floating and carrying away any oil which under prolonged light cooling loads may accumulate in undesirable quantities, logging the evaporator and temporarily interfering with its capacity to cool.

Through this arrangement all the control parts of the refrigerating system are compactly embodied in the cylinder head 76 of the compressor 20. Discharge gas from the opposite end of the compressor is fed to the passage 94 while suction gas passes from the chamber 45 through a passage 369 to the opposite end of the compressor 20. No external thermostat bulb, clamp, and capilliary tube are required. This provides better protection from damage and puts the controls in a location where they can be easily found. It protects the controls from damage when automobile mechanics are working on the engine or other parts of the automobile. It provides a firm support for these elements and conserves space within the engine compartment and minimizes the number and length of the refrigerant conduits passing through the engine compartment. It also facilitates assembly of the air conditioning system into the automobile and in this way considerably reduces the cost of installation.

The system operates generally as follows:

The compressor 20 from the cylinders discharges gas through the individual discharge passages 52, 54, and 56 and the individual discharge valves, 46, 48 and 50 in the plate 44 into the discharge chamber 58. From the discharge chamber 58, the compressed gas flows through the passages 94 and 96 to the condenser 98. The gas, after being liquefied in the condenser 98, flows through the supply conduit 121 to the threaded inlet passage 123 in the valve head 76 of the compressor. The liquid then flows through the screen 125 and the retainer 127 to the expansion valve 133 which regulates the flow of liquid refrigerant through the threaded bushing 137. The expansion valve 133 is moved away from its seat 135 by a combined temperature and pressure responsive system which includes the flexible metal diaphragm 169. The vapor charge in the hollow stem 163 exerts a closing force on the outer face of the diaphragm 169, to move the hollow stem 163 and the valve stem 139 to the left. This is counteracted by the pressure from the inlet of the valve 199 through the passages 197, 195, 187 and 189 communicating with the diaphragm chamber 199 on the inner face of the diaphragm 169.

After passing through the valve 133 the liquid refrigerant flows through the passage in the bushing 137, the chamber 145, the passage 147, the passage 149, the opening 155 and the tube or space 157 to the inlet of the evaporator 92. The heat absorbed by the evaporator 92 causes the evaporation of the refrigerant therein causing the refrigerant to leave through the suction conduit 220 connecting with the suction entrance 222 in the valve head 76. This feeds the passage 143 and exerts a temperature influence on the hollow stem 163 of the thermostatic expansion valve.

The pressure of the gas in the passage 143 lifts the piston valve 199 off its seat 228 to allow the gas to flow through the inlet passage 197 connecting with the compressor inlet chamber 45 from which the gas flows through the inlet valves 32, 34, and 36 into the cylinders. The opening of the piston valve 199 regulates the pressure within the evaporator 92 so as to prevent the evaporator from being cooled substantially below water freezing temperatures. The piston valve 199 is controlled by the spring 246 as well as the pressure within the spring chamber. The pressure within the spring chamber is controlled by the flat disc valve 256 which cooperates with the seat 262. This disc valve 256 is opened by the force of spring 284 acting through the diaphragm 268 upon the stem 258. The evaporator pressure 92 is measured by the diaphragm 268 through passages 288, 290, 292, the chamber 294 and the passage 295 from which refrigerant vapor passes around the stem 258 slowly into the chamber beneath the diaphragm 268. This pressure opposes the force of the spring 284 and lifts the diaphragm 268 to close the valve 256. This pressure so applied to the diaphragm 268 controls the opening of the piston valve 199 to maintain pressures in the evaporator 92 which are near 32° F. When the valve 256 is open, high pressure gas from the passage 94 flows in minute quantities through the passages 96, 252, 254 through the valve seat 262, the passages 235, 264 and the passages within the sleeve 232 to the spring chamber within the piston valve 199. The spring chamber is bled constantly through the small opening 230. Thus the amount of gas flowing under the control of the disc valve 256 regulates the position of the piston valve 199 so as to vary the flow out of the evaporator 92 into the compressor.

While the embodiment of the present invention as herein disclosed, constitutes a preferred form, it is to be understood that other forms might be adopted.

What is claimed is as follows:

1. In a refrigerant compressor which connects to a refrigerating system having a condensing means and evaporator means, compressing means for compressing the refrigerant, a removable valve head for said compressing means including inlet and outlet refrigerant passages communicating with said compressing means and inlet and outlet valves connected to said refrigerant passages for controlling the flow of refrigerant into and out of the compressing means, said inlet refrigerant passage being adapted to be connected to the outlet of said evaporating means, said outlet refrigerant passage being adapted to be connected to the inlet of said condensing means, said head being provided with an additional passage having two external connections and a valve seat, a refrigerant thermostatic expansion valve mounted in said valve head cooperating with said seat and having a thermosensitive element extending into heat transfer relation with said inlet passage, said additional passage having one portion on one side of said valve sheet adapted to be connected to the outlet of said condensing means and having another portion on the opposite side of said valve sheet adapted to be connected to the inlet of said evaporating means.

2. In a refrigerant compressor which connects to a refrigerating system having a condensing means and evaporator means, compressing means for compressing the refrigerant, a valve head for said compressing means including inlet and outlet refrigerant passages provided with inlet and outlet valve seats, said passages communicating with said compressing means, inlet and outlet valves connected to said inlet and outlet valve seats for controlling the flow of refrigerant into and out of the compressing means, said inlet passage being adapted to be connected to the outlet of said evaporating means, said outlet refrigerant passage being adapted to be connected to the inlet of said condensing means, said head being provided with an additional passage having two external connections and a valve seat, a refrigerant thermostatic expansion valve mounted in said valve head cooperating with said seat and having a thermosensitive element extending into heat transfer relation with said inlet passage, said inlet passage being provided with an additional valve seat in addition to said inlet valve seat, a throttling suction line regulating device including a main valve in said inlet passage cooperating with said additional seat and having an inlet forming a part of said inlet passage and a pilot valve responsive to the pressure at the inlet of said main valve for controlling the opening of said main valve, said additional passage having one portion on one side of said valve sheet adapted to be connected to the outlet of said condensing means and having another portion on the opposite side of said valve sheet adapted to be connected to the inlet of said evaporating means.

3. In a refrigerant compressor which connects to a refrigerating system having a condensing means and evaporator means, compressing means for compressing the refrigerant, a valve head for said compressing means including inlet and outlet refrigerant passages communicating with said compressing means and inlet and outlet valves connected to said refrigerant passages for controlling the flow of refrigerant into and out of the compressing means, said inlet refrigerant passage being adapted to be connected to the outlet of said evaporating means, said outlet refrigerant passage being adapted to be connected to the inlet of said condensing means, said head being provided with an additional passage having two external connections and a valve seat, a refrigerant thermostatic expansion valve mounted in said valve head cooperating with said seat and having a thermosensitive element extending into heat transfer relation with said inlet passage, said thermostatic expansion valve also including diaphragm means having a diaphragm and diaphragm chambers on opposite sides of said diaphragm, said valve being provided with a passage connecting said thermosensitive element with one of said chambers, said head having a passage connecting the other diaphragm chamber with said inlet passage, said two external connections of said additional passage being adapted to be connected respectively to the outlet of said condensing means and the inlet of said evaporating means.

4. In a refrigerant compressor which connects to a refrigerating system having a condensing means and evaporator means, compressing means for compressing the refrigerant, a removable valve head for said compressing means including inlet and outlet refrigerant passages communicating with said compressing means and inlet and outlet valves connected to said refrigerant passages for controlling the flow of refrigerant into and out of the compressing means, said inlet refrigerant passage being adapted to be connected to the outlet of said evaporating means, said outlet refrigerant passage being adapted to be connected to the inlet of said condensing means, said head being provided with a cavity containing a pressure responsive switch having an operating diaphragm, said head having an additional passage extending from one of said passages to said cavity to make said diaphragm responsive to pressure conditions in one of said passages for controlling said compressing means.

5. In a refrigerant compressor which connects to a refrigerating system having a condensing means and evaporator means, compressing means for compressing the refrigerant, a valve head for said compressing means including inlet and outlet refrigerant passages communicating with said compressing means and inlet and outlet valves connected to said refrigerant passages for controlling the flow of refrigerant into and out of the compressing means, said inlet refrigerant passage being adapted to be connected to the outlet of said evaporating means, said outlet refrigerant passage being adapted to be connected to the inlet of said condensing means, said head being provided with an additional passage containing a thermostatic expansion valve located on one side of said inlet passage and said head being also provided with diaphragm operating means located on the opposite side of said inlet passage, said diaphragm operating means having an operating connection extending through said inlet passage into operating relationship with said expansion valve, said operating connection comprising a hollow portion containing a thermosensitive fluid exposed to the temperature of said inlet passage and communicating with said diaphragm operating means to exert a pressure thereon, said additional passage having one portion of one side of said valve sheet adapted to be connected to the outlet of said condensing means and having another portion on the opposite side of said valve sheet adapted to be connected to the inlet of said evaporating means.

6. Refrigerating apparatus including compressing means and condensing means and evaporating means each having an inlet and an outlet, a member provided with separate inlet and outlet passages and a third separate passage having no fluid communication in said member with said inlet and outlet passages, said inlet and third passages each being provided with a valve seat, a refrigerant expansion valve cooperating with the valve seat of said third passage and having an operating diaphragm means mounted on said member and a diaphragm follower extending through said member to said seat in said third passage, a said member also having a throttling regulating device comprising a throttling valve in said inlet passage cooperating with the valve seat in said inlet passage and a pressure responsive control means for controlling said throttling valve, said member also having an additional passage extending from said inlet passage to said pressure responsive control means, said inlet passage being connected between the outlet of said compressing means and the inlet of said condensing means, said third separate passage being connected between the outlet of said condensing means and the inlet of said evaporating means.

7. A refrigerating apparatus as set forth in claim 14 in which the thermostatic expansion valve includes a thermosensitive element and a diaphragm means having a diaphragm and diaphragm chambers on opposite sides of said diaphragm, said thermostatic expansion valve being provided with a passage connecting said thermosensitive element with one of said chambers, said member having a passage connecting the other diaphragm chamber with the other portion of said inlet passage located between the valve seat therein and the other end of said inlet passage.

8. In a refrigerant compressor, compressing means for compressing the refrigerant, a valve head for said compressing means having two extensive generally parallel faces and inlet and discharge chambers between said faces and inlet and outlet valves between said chambers and the compressing means, said head being provided with a laterally extending inlet passage between said faces having a valve seat and having a portion transverse to said faces connecting with said inlet chamber, a throttling regulating device in said head substantially aligned with said inlet passage comprising a throttling valve in said passage cooperating with said seat in said inlet passage and a pressure responsive means for controlling said throttling valve, said pressure responsive means being connected to and being responsive to pressures in said inlet passage.

9. In a refrigerant compressor which connects to a refrigerating system having a condensing means and evaporator means, compressing means for compressing the refrigerant, a valve head for said compressing means having two extensive generally parallel faces and inlet and discharge chambers and inlet and outlet valves between said chambers and the compressing means, said head being provided with a laterally extending inlet passage between said faces having a valve seat and a portion transverse to said faces connecting with said inlet chamber, said inlet refrigerant passage being adapted to be connected to the outlet of said evaporating means, said head also being provided with an additional laterally extending passage adjacent but separate from said inlet passage having a portion extending transversely to said inlet passage provided with a valve seat, and an expansion valve cooperating with said valve seat extending in said head between said faces transversely through said inlet passage and having diaphragm operating means mounted on said head on the opposite side of said inlet passage, said additional passage having one portion on one side of said valve sheet adapted to be connected to the outlet of said condensing means and having another portion on the opposite side of said valve sheet adapted to be connected to the inlet of said evaporating means.

10. A compressor as specified in claim 9 in which the expansion valve has a thermosensitive element located in said inlet passage and a communication passage between said thermosensitive element and said diaphragm means.

References Cited by the Examiner
UNITED STATES PATENTS

| | | | |
|---|---|---|---|
| 2,321,819 | 6/1943 | Johnson et al. | 62—217 X |
| 2,370,888 | 3/1945 | Sticelber | 62—228 X |
| 2,766,593 | 10/1956 | Mitchell et al. | 62—217 |
| 2,916,892 | 12/1959 | Whitmore | 62—217 X |
| 2,993,348 | 7/1961 | Boyle | 62—217 |
| 3,001,384 | 9/1961 | Hanson et al. | 62—499 |
| 3,010,289 | 11/1961 | Kuklinski | 62—215 |
| 3,041,847 | 7/1962 | Harter et al. | 62—288 X |
| 3,064,447 | 11/1962 | Heidorn | 62—217 X |
| 3,139,736 | 7/1964 | Hanson | 62—499 X |

ROBERT A. O'LEARY, *Primary Examiner.*

W. E. WAYNER, *Assistant Examiner.*